United States Patent [19]

Mangel

[11] 4,254,880
[45] Mar. 10, 1981

[54] RACK FOR STORING OF SLIDES

[76] Inventor: Richard Mangel, Am Zollbret 1, Rheda-Wiedenbrück, Fed. Rep. of Germany

[21] Appl. No.: 967,951

[22] Filed: Dec. 11, 1978

[30] Foreign Application Priority Data

Dec. 19, 1977 [DE] Fed. Rep. of Germany ....... 2756558

[51] Int. Cl.³ .............................................. A47F 7/00
[52] U.S. Cl. .................................. 211/41; 40/158 R
[58] Field of Search ........................... 211/41, 126, 55; 40/363, 158 R; 353/DIG. 1, DIG. 5; D16/17; 206/456

[56] References Cited

U.S. PATENT DOCUMENTS

| | | | |
|---|---|---|---|
| 2,944,696 | 7/1960 | Effgen | 211/41 R X |
| 3,277,598 | 10/1966 | Lightburn | 40/158 R |
| 3,727,334 | 4/1973 | Sakamoto | 40/158 R X |
| 3,958,348 | 5/1976 | Sakamoto | 40/158 R X |
| 4,003,470 | 1/1977 | Lagorio et al. | 211/50 |

FOREIGN PATENT DOCUMENTS 7113412  4/1971  Fed. Rep. of Germany .

*Primary Examiner*—Roy D. Frazier
*Assistant Examiner*—Robert W. Gibson, Jr.
*Attorney, Agent, or Firm*—Charles E. Baxley

[57] ABSTRACT

An illustrative embodiment of the invention is directed to a compartmented rack for storing photographic slides. The slides are housed in individual compartments in which the edges of the slide frames in a row of frames form an overlapping, longitudinal, scale-like array with the adjacent row. Angular stops are formed in each of the compartments above the individual slides to retain each slide in its compartment without regard to the angular orientation of the slides and rack or the effect of some inadvertent impact.

6 Claims, 10 Drawing Figures

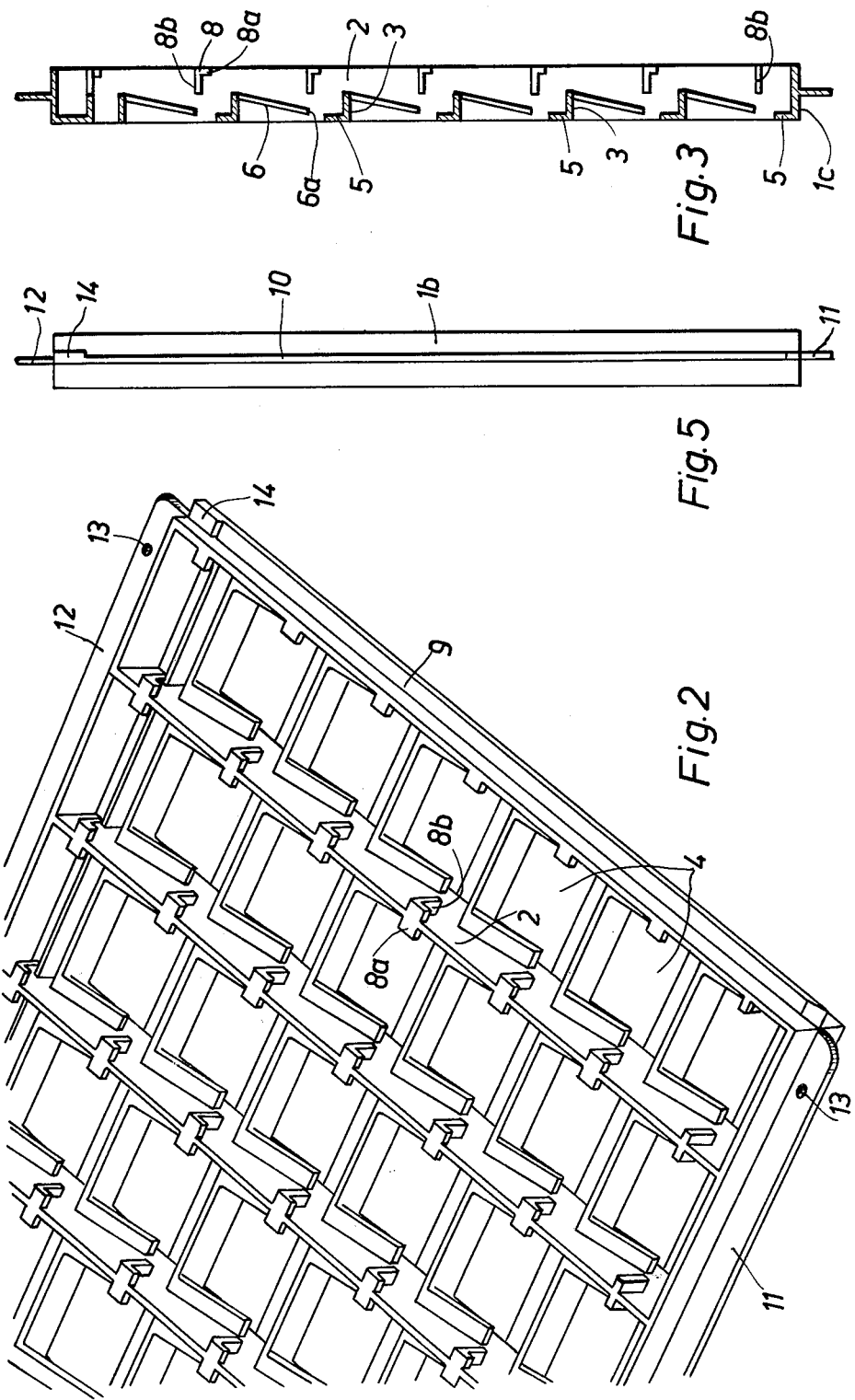

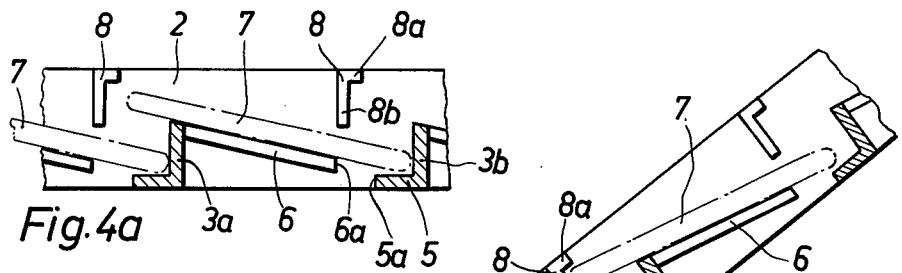
Fig.4a
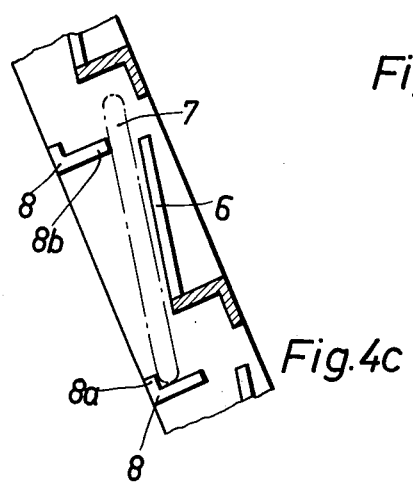
Fig.4c
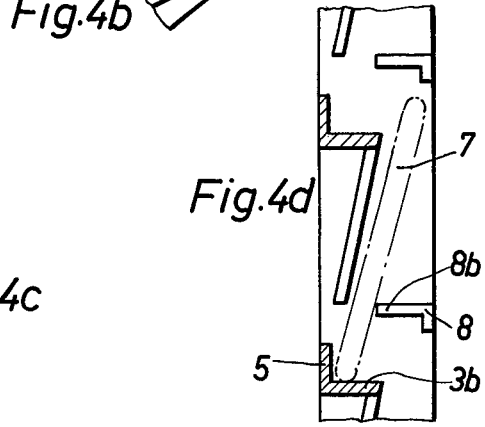
Fig.4b
Fig.4d
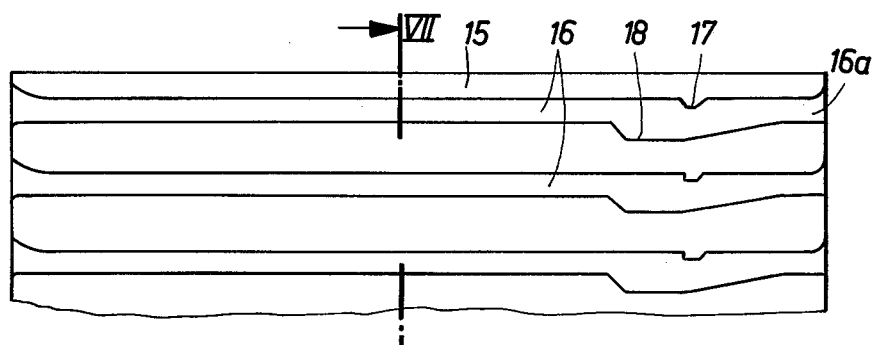
Fig.6
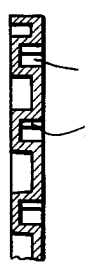
Fig.7

RACK FOR STORING OF SLIDES

This invention relates to storage structures and, more specifically, to racks for storing photographic slides, and the like.

The present invention is directed to a rack for individually storing slides in compartments. The rack is formed of a latticework of longitudinal and transverse ribs arranged on respective edges, with a distance between the longitudinal ribs that corresponds to the width of the slide frames. There is a slight distance separating the transverse ribs from each other to establish an overlapping scale-like storing of the slides in longitudinal rows between the longitudinal ribs, the transverse ribs not being as high as the longitudinal ribs.

German Utility Model No. 71 13 412 describes a rack for storing slides in which the slides are arranged in individual compartments between longitudinal ribs. These slides overlap in scale-like manner. A part of the upper frame of these slides, moreover, covers the lower part of the frame of the slide in the next following compartment. This overlapping configuration not only permits more slide frames to be arranged in a rack than in the case of an individual, completely separate array of slides in adjacent compartments; but the rack also can be easily filed, and the slide frames can be conveniently viewed over an illuminated plate as a result of their somewhat oblique position and easily removed. It has been found, however, that with this type of arrangement the slide frames can easily slip out of their compartments and fall out of the respective racks when the rack, or the cabinet in which these racks are arranged, receives a blow or impact.

The object of the invention is, therefore, to provide a rack for slide frames which, while retaining the advantages of the known rack, nevertheless assures a dependable, non-slidable retention and storage of the slides in the individual compartments. Furthermore, the slide frames now may be stored, supported and viewed both horizontally and vertically or in any other suitable orientation.

The invention achieves this purpose, in the case of a rack for storing slides in compartments of the general type described above, by cutting out the bottom surface of the rack in each compartment, leaving only a narrow bottom ledge on the transverse rib which is located toward the front of each compartment. On both longitudinal ribs, slide edges are provided. These edges are inclined from the top edge of the rear transverse rib towards the bottom ledge and have angular stops which are open towards the front transverse rib. The outer contour of the rack also is provided with slide and gripping ledges.

Angular stops are advantageously arranged in each case in the front third of each compartment. These stops consist of a short arm which terminates with the upper edge of the longitudinal ribs and is parallel to the surface of the rack and a longer arm which is perpendicular thereto and extends approximately up to the mid-height of the longitudinal ribs. The slide edges arranged on the longitudinal ribs extend lengthwise over the rear two-thirds of each compartment. It is advisable to arrange the angular stops above the open spaces formed by gaps in the row ends respective slide edges and the narrow bottom ledges. In accordance with another feature, the slide ledges of the side surfaces of the outer contour have at the rear end on their upper side a protuberance-like reinforcement. In accordance with another feature, the gripping ledges of the front and rear surfaces of the outer contour each have at least one passage hole at their ends.

One embodiment of the rack in accordance with the invention will now be explained in detail with reference to the drawings, in which:

FIG. 2 is a perspective elevation of a part of the rack;

FIG. 3 is a section along the line III of FIG. 1,

FIGS. 4a to 4d are examples for the storage and holding of the slide frames in different rack positions;

FIG. 5 is a side view of the rack of FIG. 1, seen from the left,

FIG. 6 is a section through a guide wall of a cabinet for receiving a large number of racks in accordance with the invention, and FIG. 7 is a section along the line VII of FIG. 6.

Figure 1:
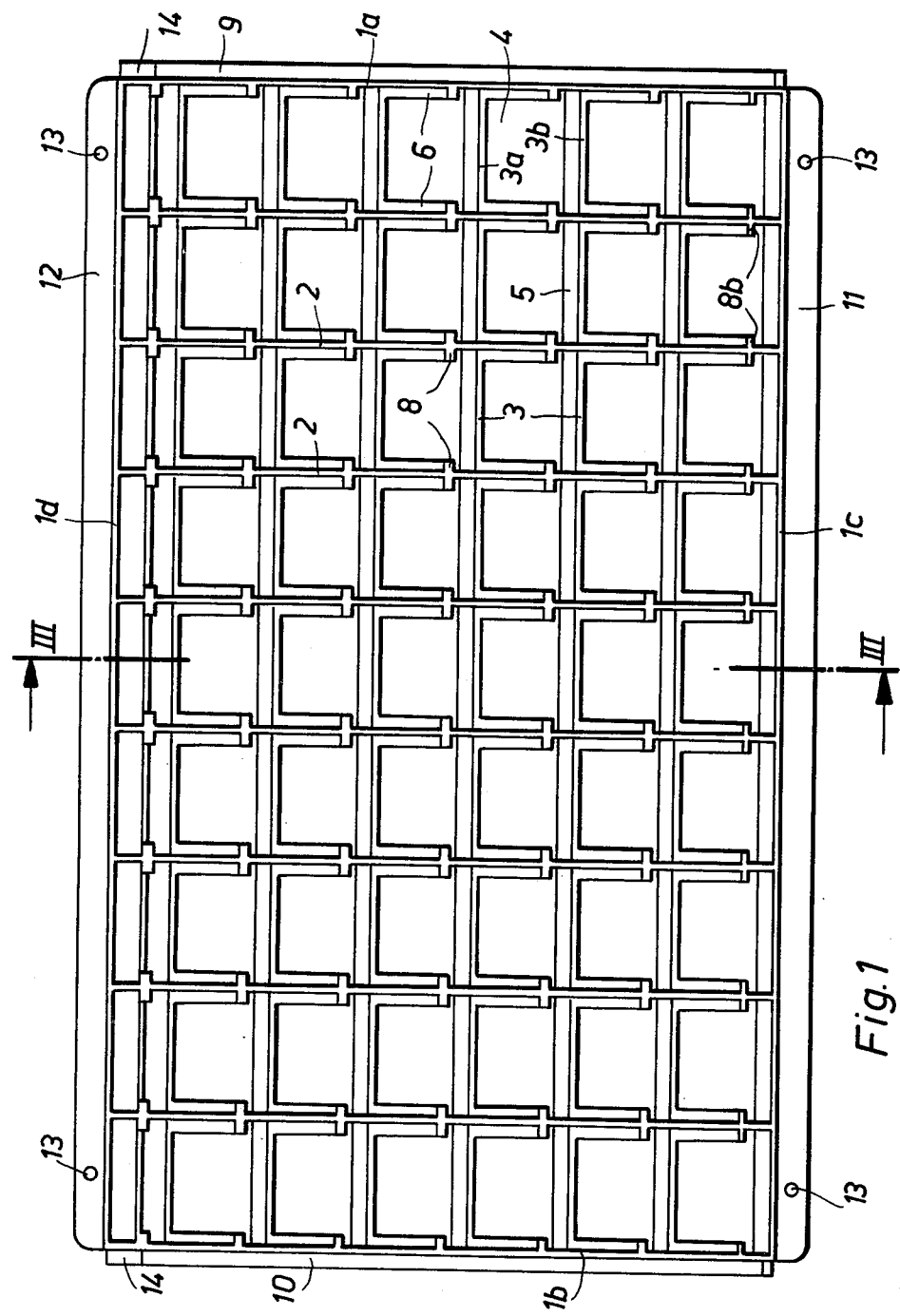
FIG. 1 is a top view of the rack in accordance with the invention.

The illustrative rack (FIGS. 1 and 2) is about 2 cm high and consists of an edge framing on all sides formed of side walls 1a, 1b, front wall 1c and rear wall 1d all standing on edge. The rack is divided into a lattice forming compartments 4 by means of equidistant longitudinal ribs 2 that are parallel to each other and to the side walls and by perpendicularly disposed transverse ribs 3 which are also equidistantly spaced from each other. While the longitudinal ribs 2 have the same height as the edge framing 1a to 1d, the transverse ribs 3 are only about half as high as the longitudinal ribs. The bottom surface of the rack is removed except for a narrow bottom ledge 5 in each compartment 4 which extends parallel to the front wall 1c and the transverse ribs 3. The connection between the narrow bottom ledge 5 and a respective transverse rib 3 forms a corner (FIG. 3).

The longitudinal ribs are spaced apart by a distance which is adapted to the slide frames so that these frames can be inserted between adjacent pairs of longitudinal ribs. The distance between the transverse ribs is, however, smaller so that, as shown in FIG. 4a, the slide frames 7 are arranged in overlapping manner between adjacent pairs of the longitudinal ribs 2.

In each compartment 4 a narrow slide edge 6 (FIGS. 1, 2 and 3) is provided on each of the longitudinal ribs 2. These slide edges extend from the rear transverse rib 3a towards the bottom ledge 5 on the front transverse rib 3b. These slide edges 6 serve to guide the slide frames upon insertion into the compartments 4 and, together with the upper edge of the front transverse rib 3a and the corner which the bottom ledge 5 makes with the front transverse rib 3b (FIG. 4a) form the support for the slide frame 7.

Alongside the slide edges 6 there is also provided, in each compartment 4 on each of the longitudinal ribs 2 an angle stop 8 (FIGS. 2 and 4a). The stop has a shorter arm 8a that is parallel to the upper edges of the longitudinal ribs. At right angles, to the arm 8a, longer arm 8b is directed towards the lower edge of the longitudinal ribs 2. The length of the longer arm 8b extends approximately over half the height of the longitudinal rib 2. The right angle formed by these two arms of the stop 8 is open in the direction that is towards the front transverse rib 3b of each compartment 4. This stop 8 is so positioned on the longitudinal rib, as best noted in FIG. 4a, that it is precisely above the space between the lower end 6a of the slide edge 6 and the free edge 5a of the bottom ledge 5. In the row of compartments along the front wall 1c of the edge framing (FIG. 1) the stops merely have the longer arm 8b.

The outer framing of the rack 1 (FIGS. 1, 2 and 5) is provided on its side walls 1a and 1b with slide ledges 9 and 10 respectively and on its front wall 1c and rear wall 1d with a gripping ledge 11 and 12 respectively. The somewhat broader gripping ledges 11 and 12 have holes 13 which pass through them. These holes 13 on the gripping ledge 11 are located inwardly of the edges and respective adjacent ends of the ledge 11 equal distances, the holes 13 on the gripping ledge 12 being in longitudinal alignment with the associated holes 13 in the ledge 11. These holes 13 enable the rack to hang on pins on a wall and in this way make it possible to arrange several racks one above the other. In order to permit the rack to hang flat against the wall, it may be advisable to have the front gripping ledge staggered in a vertical direction with respect to the rear gripping ledge by an amount that is equal to the thickness of the ledges. The front and rear gripping ledges 11 and 12 are furthermore suitable for the application of legends which provide explanations, classification and slide frame filing data.

Each of the slide ledges 9 and 10 has at its rear end a cog-shaped projection 14 which serves as a pull-out stop and prevents the unintentional removal of the rack from a storage cabinet. FIGS. 6 and 7 show how the lateral guide wall 15 can be developed in a collection cabinet in order to accommodate a group of racks. The guide grooves 16 are separated by a distance which is only slightly greater than the height of the racks in order to utilize the capacity of the collecting cabinet to the greatest extent possible. The width of the guide groove 16 is adapted to the thickness of the slide ledges 9 and 10 respectively, including the cog-shaped projection. Shortly behind the front end 16a of the guide groove 16, the groove widens to form a disengagement region 18.

The rack, after introduction into the cabinet, can be lifted somewhat at its front end to move the cog-shaped projections 14 on the slide ledges 9 and 10 below the respective mating stops 17 on the upper edges of the guide grooves 16. Upon pulling the rack out of the cabinet, the cog-shaped projection 14 slides along the upper edge of the guide groove 16 until it strikes the mating stop 17 and is stopped. If the rack is to be removed completely, it is only necessary to lift the front end of the rack for the mating stop 17 to disengage the cog-shaped projection 14.

The operation of the rack in accordance with the invention is shown in FIGS. 4a to 4d. FIG. 4a is a fragmentary view of the rack in use in the horizontal position. The slide frame 7 is inserted into a compartment 4 (FIG. 1 and FIG. 4a) by placing the lower edge of the frame on the slide edges 6, and allowing the frame to slide down the slide edge and then releasing the upper edge. The slide frame then slides below the angular stop 9 until the frame abuts the front transverse rib 3b and rests upon the bottom ledge 5. As mentioned above, the bottom ledge 5 forms a corner with the transverse rib, thereby providing a reliable support for the lower edge of the slide frame, while the upper edge of the slide frame lies over the upper edge of the rear transverse rib 3a. The lateral edges of the frame now lie on the slide edges 6 of the longitudinal ribs. The transverse rib 3a serves, on the one hand via its upper edge, as support for the slide frame of the compartment lying to the right of it as viewed in the plane of FIG. 4a. The rib 3a, in combination with the bottom ledge 5 of the compartment located to the left of the rib 3a, provides a resting surface for the slide frame which is associated with that compartment.

Upon rotation of the rack by about 90° in a counter clockwise direction, the slide frame 7 shifts into the position that is shown in FIG. 4b. In this position, the frame 7 slides to the left, as viewed in the drawing, of the slide edge 6 and strikes the angular stop 8 of the adjacent compartment to the left of the frame. The frame is held fast by the arms of the stop 8. This position is retained until the rack is turned by somewhat more than 90°, i.e. to an angle that is beyond the vertical position of the rack.

Upon further turning of the rack up into the vertical position so that the front gripping strip 11 (FIG. 2) is at the top, the slide frames will remain in the position with respect to the rack that is shown in FIG. 4b.

FIG. 4c shows the conditions that are established when the rack is tilted out of its horizontal position in a counterclockwise direction by about 120°. The upper edge of the slide frame 7 rests in the angular stop 8 while the lower edge of the frame lies against the free end of the long arm 8b of the other stop in the compartment that houses the frame 7. In this position, the rack can be swung by more than 180° without allowing the slide frames to fall out of the rack.

FIG. 4d shows the position of the slide frames when the rack is tipped 90° in a clockwise direction from the horizontal position. In this orientation the rear gripping ledge 12 is on top. The lower edge of the slide frame 7 rests in the corner formed by the front transverse rib 3b and the bottom ledge 5 and against the free edge of the long arm 8b of the stop. The slide frames are in this connection inclined slightly forward and can be viewed well in this position if an illuminated surface is present behind the rack.

The position of the slide frame with respect to the rack shown in FIG. 4d is also produced when the front gripping ledge 11 of the rack is struck. All slide frames then only have the possibility of moving on the slide edges 6 in a direction that is parallel to the longitudinal ribs 2 up to the stop 8. Without the presence of the stop 8 the slide frames would slip out of the respective compartments and shift over each other in a direction that is parallel to the longitudinal ribs 2 towards the rear gripping ledge 12 and fall out of the raack. Even in the case of a blow against the bottom of the rack (FIG. 4a) the slide frames can not drop out since they are held back by the lower edge of the long arm 8b of the stop 8.

In connection with FIGS. 6 and 7 it was explained above how the racks can be arranged in the horizontal position in a storage cabinet. It is, of course, also possible to arrange the rack in the vertical position in cabinets if the gripping and transverse ledges are interchanged.

I claim:

1. A rack having a transverse front and rear for the individual storage of slides in compartments comprising a latticework of longitudinal and transverse ribs arranged on edge, adjacent pairs of longitudinal ribs being spaced from each other by a distance that corresponds to the width of a slide, adjacent pairs of transverse ribs being spaced from each other by a distance that is sufficient to establish an overlapping scale-like storage of the slides in longitudinal rows between the longitudinal ribs, the transverse ribs, each having respective heights that are not as great as the heights of the longitudinal ribs, the bottom surface of each compartment formed by adjacent pairs of longitudinal and transverse ribs being cut out to provide a narrow bottom ledge on the transverse ribs that are oriented toward the front in each of of the compartments, slide edges being formed on the longitudinal ribs in each compartment, the slide edge being inclined from the upper edge of one of the transverse ribs downwardly and forwardly toward the bottom ledge of said compartment, an angular stop formed on at least one of said longitudinal ribs in each of the compartments, each of the angular stops being open toward the respective transverse rib, from which the slide edge is inclined and the rack further having an outer contour that is provided with slide and grip ledges.

2. A rack according to claim 1, wherein the angular stops are arranged in the front of each compartment each stop having a shorter arm which establishes a ledge that forms a surface portion of the rack, and a longer arm which is perpendicular to the shorter arm and extends approximately to the mid-height of the longitudinal rib on which said angular stop is formed.

3. A rack according to claim 1, wherein the slide edges that are formed on the longitudinal ribs extend longitudinally over the rear two-thirds of each respective compartment.

4. A rack according to claims 2 or 3, wherein the angular stops are arranged above the spaces formed by the free ends of the slide edges and the respective associated narrow bottom ledges.

5. A rack according to claim 1 wherein the outer contour further comprises slide ledges that have adjacent to one of the grip ledges one cog-like projection on each of the slide ledges.

6. A rack according to claim 1, wherein each of the gripping ledges of the outer contour each have at least one continuous hole formed therein, said holes being in longitudinal alignment.

* * * * *